United States Patent Office 3,709,815
Patented Jan. 9, 1973

3,709,815
BOILER WATER TREATMENT
Jerry Emile Boothe, Pittsburgh, and Thomas Edward Cornelius III, Coraopolis, Pa., assignors to Calgon Corporation, Pittsburgh, Pa.
No Drawing. Filed July 1, 1971, Ser. No. 158,987
Int. Cl. C02b 5/06
U.S. Cl. 210—58                              7 Claims

ABSTRACT OF THE DISCLOSURE

It is disclosed that polymers containing at least 12 mole percent of 2 - acrylamido 2 - substituted propane-1-sulfonic acid perform as excellent boiler water dispersives and conditioners. Certain alkyl and other substitutes may be inserted in the beta position of the unsaturated group and in the 2 position of the propane group. The monomer should be present in the polymer chain in amounts at least about 12 mole percent, and the polymer should have an average molecular weight of at least 20,000.

BACKGROUND OF THE INVENTION

Certain types of water-soluble polymers have been used in the past to fluidize precipitates, silt, or other solids which may be found in high temperature boiler water systems. For example, in Baum et al. copending application Ser. No. 727,005, filed May 6, 1968, now U.S. Pat. No. 3,630,937, entitled "Boiler Water Treatment," certain water-soluble sulfonated polystyrenes are used by themselves and/or in combination with other boiler chemicals. Certain polyacrylic compounds are used as "sludge conditioners" in boilers by Crum et al. in U.S. Pat. 2,783,200.

In Salutsky U.S. Pat. 3,514,376, short chain polyacrylic acids (molecular weight: 5,000–13,000) are used to prevent scale formation in boilers.

In Monsanto's Ruehrwein U.S. Pat. 2,980,610, polyacrylamides are used for the purpose of inhibiting the precipitation of calcium and other salts in boiler waters. Sulfonated methylol polyacrylamides have also been used, as have hydrolyzed polyacrylamides.

Other water-soluble polymers which have been used for boiler water treatment include naturally-occurring short-length compounds such as tannins and lignins, tannery waste (U.S. Pat. 3,184,407), alginates, and the like.

The composition of the solids, precipitates, and silt-like materials which may normally be found in boilers is well known in the art, and will vary with the type of pre-treatment used, such as deionization, lime-soda softening, etc. The solids include silicates, phosphates, and various other components introduced as suspended matter in the boiler feed water or as alkaline earth metal precipitates. Such solids tend to form incrustations or settle in particular areas of the boiler, causing localization of heat-transfer problems. If left untreated, short boiler life may be expected.

SUMMARY OF THE INVENTION

It has been discovered that water-soluble polymers containing at least 12 mole percent of the structural unit

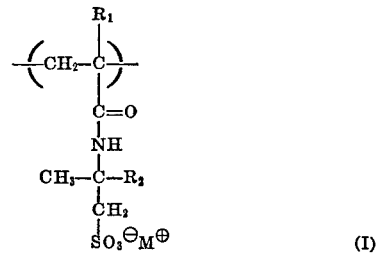

where $R_1$ is H or methyl, $R_2$ is H, phenyl, alkyl groups (branched or linear) having up to 12 carbon atoms or cycloalkyl groups having up to 6 carbon atoms, and where M is H, $N(R_3)_4$ (where $R_3$ is H, alkyl up to 4 carbon atoms, linear or branched, cycloalkyl up to 6 carbon atoms, benzyl, phenyl and hydroxyalkyl of up to 6 carbon atoms, selected independently), alkali and alkaline earth metals, Zn or Cu, when used alone or in combination with other ingredients, fluidize precipitates and/or silts and/or solids normally found in high temperature boiler water systems.

In the laboratory, we have correlated the performance of the polymers in a tri-calcium phosphate floc test with their usefulness as a commercial boiler water treatment. Those polymers which tend to gather the individual particles of the synthetic boiler water and increase their settling rate (expressed as cm./sec.) have performed well in field use. In the test, the test composition is added to a solution of 500 p.p.m. $Ca_3(PO_4)_2$, agitated, and the settling time noted.

A homopolymer of 2 - acrylamido - 2 - methyl propane - 1 - sulfonic acid (2-AMPSA) exhibited excellent settling times and floc building with as little as 0.1 p.p.m. The following Table 1 will show those results.

TABLE 1
[$Ca_3(PO_4)_2$ floc test]

| Treatment level, p.p.m.: | Settling time | Floc size |
|---|---|---|
| None | 6 minutes | Small. |
| 0.1 | 4 minutes 25 seconds | Small to medium. |
| 1 | 53 seconds | Large. |
| 3 | 40 seconds | Do. |
| 5 | 37 seconds | Do. |
| 10 | 50 seconds | Extremely large. |
| 15 | 66 seconds | Do. |

The polymers which we may used should contain at least 12 mole percent of 2-AMPSA, the term "AMPSA" being used to designate the generic Formula I in the first paragraph of the summary hereof. The remainder of the polymer should be made up primarily of water-soluble monomers but may include water-insoluble monomers up to about 25 mole percent of the total chain. Water-soluble monoethylenically unsaturated monomers include acrylic acid, methacrylic acid, the alkali metal, amine and ammonium salts of acrylic and methacrylic acid, methacrylamide, β-aminoethyl acrylate, β-aminoethyl methacrylate, N-methyl-β-aminoethyl acrylate, N-methyl-β-aminoethyl methacrylate, N,N-dimethyl β-aminoethyl methacrylate, and the water-soluble N-alkyl substituted acrylamide and methacrylamides such as N-isopropyl acrylamide. Still other comonomers of the water-soluble class are the alkali metal styrene sulfonates, and alkali metal vinylbenzoates, and diacetone acrylamide. We prefer to use copolymers of Formula I and acrylamide or acrylic acid having at least 12 mole percent of Formula I, particularly 2-AMPSA. Also useful are allyl alcohol, N-vinyl pyridine, N-vinyl pyrrolidone, and N-vinyl-2-oxazolidone. If desired, water-insoluble monomers can also be copolymerized to provide polymers useful herein. To maintain the necessary water solubility, such copolymers will usually contain no more than about 25 mole percent of the water-insoluble comonomer. Illustrative of such comonomers are styrene, vinyl chloride, vinylidene chloride methylmethacrylate, and methacrylonitrile.

When 15 p.p.m. of a 50/50 mole ratio copolymer of acrylamide and 2-acrylamido-2-methyl propane-1-sulfonic acid (hereafter, acrylamide/2-AMPSA 50/50 mole ratio) was added to a tri-calcium phosphate floc at room temperature and agitated, the settling time was one minute and five seconds. This compares with six minutes settling time for a control test containing no polymer.

The $Ca(PO_4)_2$ floc test as described above has also been run on representative copolymers with acrylamide and acrylic acid, as is shown in Tables 2 and 3.

TABLE 2

[$Ca_3(PO_4)_2$ floc test settling time in seconds]

| Composition—moles acrylamide/2-AMPSA | Treatment level | | | |
|---|---|---|---|---|
| | 0.5 p.p.m. (secs.) | 1.0 p.p.m. (secs.) | 5.0 p.p.m. (secs.) | 15.0 p.p.m. (secs.) |
| 0.975/0.025 | 320 | 325 | 330 | 400 |
| 0.95/0.05 | 330 | 300 | 330 | 360 |
| 0.90/0.10 | 240 | 200 | 180 | 195 |
| 0.85/0.15 | 165 | 125 | 95 | 155 |
| 0.75/0.25 | 85 | 50 | 50 | 100 |
| 0.65/0.35 | 75 | 50 | 55 | 125 |
| 0.49/0.51 | 60 | 45 | 45 | 70 |
| 0.40/0.60 | 95 | 55 | 45 | 60 |
| 0.30/0.70 | 105 | 70 | 35 | 40 |
| 0.20/0.80 | 110 | 70 | 45 | 55 |
| 0.10/0.90 | 90 | 80 | 40 | 45 |

TABLE 3

[$Ca_3(PO_4)_2$ floc test settling time in seconds]

| Composition—moles acrylic acid/2-AMPSA | Treatment level | | | |
|---|---|---|---|---|
| | 0.5 p.p.m. (secs.) | 1.0 p.p.m. (secs.) | 5.0 p.p.m. (secs.) | 15.0 p.p.m. (secs.) |
| 0.25/0.75 | 80 | 55 | 40 | 70 |
| 0.75/0.25 | 205 | 210 | 140 | 115 |

The molecular weight of our polymers should be at least about 20,000. So far as we are aware, there is no maximum molecular weight above which the composition is totally inoperable.

Our polymers are effective to some degree in any concentration up to about 30 p.p.m. With respect to a minimum concentration, it may be observed that a very small quantity of polymer is effective to a small degree. As a practical matter, however, for most large industrial boilers, the polymers should be used in concentrations of at least 0.1 p.p.m.

We do not intend to be restricted to the above particular examples and description of our invention. It may be otherwise variously practiced within the scope of the following claims.

We claim:

1. Method of treating solids in boiler water comprising adding to said boiler water a small amount of a water-soluble polymer containing at least about 12 mole percent mer units of the structural formula

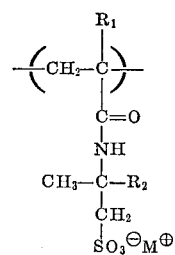

where $R_1$ is H or methyl, $R_2$ is H, phenyl, alkyl groups (branched or linear) having up to 12 carbon atoms or cycloalkyl groups having up to 6 carbon atoms, and where M is H, $N(R_3)_4$ (where $R_3$ is H, alkyl up to 4 carbon atoms, linear or branched, cycloalkyl up to 6 carbon atoms, benzyl, phenyl and hydroxyalkyl of up to 6 carbon atoms, selected independently), alkali and alkaline earth metals, Zn or Cu, when used alone or in combination with other ingredients, fluidize precipitates and/or silts and/or solids normally found in high temperature boiler water systems.

2. Method of claim 1 in which $R_1$ is hydrogen and $R_2$ is a methyl group and M is sodium.

3. Method of claim 1 in which the polymer is a homopolymer.

4. Method of claim 1 in which the polymer is a copolymer of 2-acrylamido-2-methyl propane-1-sulfonic acid and acrylamide.

5. Method of claim 1 in which the polymer is a copolymer of 2-acrylamino-2-methyl propane sodium sulfonate and acrylamide.

6. Method of claim 1 in which the polymer used is a copolymer with acrylic acid.

7. Method of claim 1 in which the polymer is added to the boiler in quantities of about 0.1 p.p.m. to about 30 p.p.m.

References Cited

UNITED STATES PATENTS 2,980,610 4/1961 Ruehrwein _____ 210—58
3,506,707 4/1970 Miller et al. _____ 260—79.3
3,692,673 9/1972 Hoke _____ 210—52

MICHAEL ROGERS, Primary Examiner

U.S. Cl. X.R.

203—7; 252—180